United States Patent
Yu

(10) Patent No.: US 8,927,444 B2
(45) Date of Patent: Jan. 6, 2015

(54) CONSTITUTION OF COVER GLASS

(71) Applicant: Fortune Technology Corp., New Taipei (TW)

(72) Inventor: Allen Yu, New Taipei (TW)

(73) Assignee: Fortune Technology Corp., New Taipei (TW)

( * ) Notice: Subject to any disclaimer, the term of this patent is extended or adjusted under 35 U.S.C. 154(b) by 32 days.

(21) Appl. No.: 13/845,258

(22) Filed: Mar. 18, 2013

(65) Prior Publication Data
US 2014/0274655 A1 Sep. 18, 2014

(51) Int. Cl.
*C03C 3/093* (2006.01)
*C03C 3/091* (2006.01)

(52) U.S. Cl.
CPC .............. *C03C 3/093* (2013.01); *C03C 3/091* (2013.01)
USPC ............................................ 501/67; 428/410

(58) Field of Classification Search
CPC ........ C03C 3/093; C03C 3/087; C03C 21/00; C03C 21/02
USPC ............................................ 501/67; 428/410
See application file for complete search history.

(56) References Cited

U.S. PATENT DOCUMENTS

| 2012/0052275 A1* | 3/2012 | Hashimoto et al. ........... 428/215 |
| 2012/0171497 A1* | 7/2012 | Koyama et al. ............... 428/428 |

* cited by examiner

*Primary Examiner* — Karl Group
(74) *Attorney, Agent, or Firm* — Bacon & Thomas, PLLC

(57) ABSTRACT

A constitution of cover glass, the compositions consist in terms of weight % on the oxide basis, of from 64 to 69 wt. % of $SiO_2$; from 7 to 11.5 wt. % of $Al_2O_3$; from 1.5 to 2.5 wt. % of $B_2O_3$; from 4.5 to 7.5 wt. % of MgO; $0\%<CaO\leq2.5\%$; $0\%<ZnO\leq2\%$; $0\%<ZrO_2\leq0.2\%$; $0\%<TiO_2\leq1\%$; from 14.5 to 16.5 wt. % of $Na_2O$; from 1 to 4 wt. % of $K_2O$; and $0\%<SnO_2\leq0.4\%$. The constitution then can be melted to form cover glass. Thereafter, the cover glass is dipped in $KNO_3$ solution so that sodium ions, which is smaller in volume, contained in certain depth from the surface layer of the cover glass can be substituted by potassium ions, which is larger in volume. In this manner, squeezing effect is generated on the surface layer so as to form cover glass having high strength and resistance in both abrasion and scratch.

1 Claim, 1 Drawing Sheet

| | |
|---|---|
| Weight % of $SiO_2$ | 64%~69% |
| Weight % of $Al_2O_3$ | 7%~11.5% |
| Weight % of $B_2O_3$ | 1.5%~2.5% |
| Weight % of MgO | 4.5%~7-5% |
| Weight % of CaO | 0%<CaO≦2.5% |
| Weight % of ZnO | 0%<ZnO≦2% |
| Weight % of $ZrO_2$ | 0%<$ZrO_2$≦0.2% |
| Weight % of $TiO_2$ | 0%<$TiO_2$≦1% |
| Weight % of $Na_2O$ | 14.5%~16.5% |
| Weight % of $K_2O$ | 1%~4% |
| Weight % of $As_2O_3$ | 0 |
| Weight % of $Sb_2O_3$ | 0 |
| Weight % of $SnO_2$ | 0%<$SnO_2$≦0.4% |
| The total content of CaO and MgO is preferably 4.5%~10% ||
| The total content of $Na_2O$ and $K_2O$ is preferably 15.5%~20.5% ||

CONSTITUTION OF COVER GLASS

BACKGROUND OF INVENTION

1. Field of the Invention

The present invention relates to a constitution of cover glass, more particularly to a cover glass having the properties of high strength and resistance in abrasion and scratch, without inclusion of environmentally unfriendly ingredients as $As_2O_3$ or $Sb_2O_3$.

2. Brief Description of the Prior Art

Nowadays, the cover glass used in touch panel and LCD of mobile facilities such as mobile phone, tablet or notebook PC is aluminosilicate glass, which is further strengthened by ion exchange process. This glass constitution contains only a trace amount of alkali metal oxides and the glass can be manufactured by forming method of float process or down-draw process.

A glass compositions disclosed in the Taiwanese Patent Gazette No. I252844 contains $As_2O_3$ and $Sb_2O_3$, harmful to human body and environment. If $As_2O_3$ and $Sb_2O_3$ are substituted by different compositions, the original optical and physical properties of glass will be changed. Therefore, extensive research and development should be conducted on the ingredients and their weight percents of glass compositions so as to solve the problem.

When the temperature of melting glass is reduced during forming process, the glass tends to generate crystallization phenomena which may cause devitrification (i.e., lose transparency due to crystal precipitation of glass). The maximum temperature at which a glass starts the devitrification or the initiate crystallization is referred to as Liquidus Temperature, LT. In order to avoid devitrification which generates negative effect on the appearance of glass, the glass liquidus temperature requires to be as low as possible. Thus, when the operating temperature is higher than the glass liquidus temperature, devitrification or crystallization will not occurred even after a long time heat treatment, otherwise prone to devitrification or crystallization which leads to impurities generation on the surface or in the interior of the glass. This will result in change of stress distribution inside glass, reduction of glass hardness and strength, deterioration of yield rate. One such example is the glass disclosed in Taiwanese Patent Gazette No. I305768, in which the liquidus temperature is higher than 1000° C. Thus, the glass has a worse stability.

Further, the melting temperature of raw material in melting process is required to be as low as possible so as to reduce energy consumption and to increase lifetime of blast furnace. In a glass disclosed in Taiwanese Patent Gazette No. 200637800, complete melting of raw materials couldn't be realized until the temperature reaches 1600° C. or above. Therefore, energy consumption is high, and manufacturing cost down is almost impossible.

In view of the above disadvantages of conventional glass, the present invention proposes a novel constitution of cover glass in which environmentally unfriendly compositions such as $As_2O_3$ and $Sb_2O_3$ can be substituted by adding or changing proportion of compositions, and then a cover glass having devitrification resistance can be produced so as to solve the problem of inconsistency with environmental standard.

SUMMARY OF THE INVENTION

In view of the above, the main object of the present invention is to substitute environmentally unfriendly compositions such as PbO, $As_2O_3$ or $Sb_2O_3$ by adding or changing proportion of compositions, and then a cover glass having devitrification resistance can be produced so as to solve the conventional problems of harmful gases exhaust in melting process and toxic substance containing in glass products.

In order to achieve above object, the present invention is to strengthen the glass structure by adding or changing proportion of compositions of glass constitution, and then a cover glass having devitrification resistance can be produced. The compositions of the glass constitution consist in terms of weight % on the oxide basis, of from 64 to 69 wt. % of $SiO_2$; from 7 to 11.5 wt. % of $Al_2O_3$; from 1.5 to 2.5 wt. % of $B_2O_3$; from 4.5 to 7.5 wt. % of MgO; 0%<CaO≤2.5%; 0%<ZnO≤2%; 0%<$ZrO_2$≤0.2%; 0%<$TiO_2$≤1%; from 14.5 to 16.5 wt. % of $Na_2O$; from 1 to 4 wt. % of $K_2O$; and 0%<$SnO_2$≤0.4%; wherein the total content of CaO and MgO is preferably 4.5%~10%; the total content of $Na_2O$ and $K_2O$ is preferably 15.5%~20.5%. The above constitution then can be melted to form cover glass having devitrification resistance property. Moreover, network structure can be formed in the glass by adding $SiO_2$; stiff surface can be created, heat tolerance, devitrification resistance can be increase, and rate of expansion of glass can be reduced by adding $Al_2O_3$; viscosity and coefficient of expansion of glass can be reduced by MgO and CaO; corrosion resistance and meltability can be increased by adding ZnO; chemical resistance of glass can be raised by adding $ZrO_2$; melting temperature of glass raw materials can be lowered by adding $TiO_2$; easiness of formability of glass can be achieved by $Na_2O$; glass viscosity can be increased so as to allow the glass to become hard and to have gloss by adding $K_2O$; and PbO, $As_2O_3$ or $Sb_2O_3$ can be substituted by $SnO_2$ which acts as a refining agent, so that the problems of conventional glass, such as harmful gases exhaust in melting process and toxic substance containing in glass products due to inclusion of environmentally unfriendly compositions of PbO, $As_2O_3$ or $Sb_2O_3$ can be solved.

DETAILED DESCRIPTION OF PREFERRED EMBODIMENTS

The present invention is mainly to provide a constitution of cover glass, the materials (compositions) consist in terms of weight % on the oxide basis, of:

(1) $SiO_2$, 64%~69%;
(2) $Al_2O_3$, 7%~11.5%;
(3) $B_2O_3$, 1.5%~2.5%;
(4) MgO, 4.5%~7.5%;
(5) 0%<CaO≤2.5%;
(6) 0%<ZnO≤2%;
(7) 0%<$ZrO_2$≤0.2%;
(8) 0%<$TiO_2$≤1%;
(9) $Na_2O$, 14.5%~16.5%;
(10) $K_2O$, 1%~4%; and
(11) 0%<$SnO_2$≤0.4%;
(12) wherein the total content of CaO and MgO is preferably 4.5%~10%; and the total content of $Na_2O$ and $K_2O$ is preferably 15.5%~20.5%.

According to the present invention, as the weight percent of each composition, according to its physical properties, will place impact of different degree on the characteristic, structure and production of glass, it is necessary to place limitation on the weight percent of each composition. The selection of each composition and limitation of its weight percent in a certain range will be explained in detail as below.

$SiO_2$ is the primary composition for forming glass network structure, so it is efficient in increasing the chemical durability and viscosity and in decreasing the liquidus temperature of glass. The preferred content of $SiO_2$ in weight % is 64%~69%. If $SiO_2$ is less than 64%, the glass produced is easily to get devitrification. On the other hand, if $SiO_2$ is more than 69%, the melting temperature of glass is too high, also the glass produced is easily to get devitrification.

$Al_2O_3$ is used to increase the structural strength of glass so as to allow the glass to have a stiff surface, to increase both the heat and the devitrification resistance, to reduce the rate of expansion of glass, and to increase both the chemical durability and the viscosity of glass. The preferred content of $Al_2O_3$ in weight % is 7%~11.5%. If $Al_2O_3$ is less than 7%, the glass thus produced may be easily to get devitrification and is easily subject to corrosion by outside moisture or chemical reagent. On the other hand, if $Al_2O_3$ is more than 11.5%, the melting temperature of glass is too high to be advantageous for manufacturing in ordinary melting furnace.

$B_2O_3$ is acted to help melting in glass manufacturing for decreasing the viscosity of glass during glass melting, so it is advantageous for homogenization of glass and reduction on melting temperature. The preferred content of $B_2O_3$ in weight % is 1.5%~2.5%. If $B_2O_3$ is less than 1.5%, the effect to help melting cannot be in full play and easily to get glass devitrification. On the other hand, if $B_2O_3$ is more than 2.5%, strain point of glass can be significantly lowered so as to be disadvantageous to the application in subsequent processes.

MgO is for lowering the viscosity and coefficient of expansion of glass during glass melting so as to reduce contents of bubble and impurities, to lower the liquidus temperature, and to increase devitrification resistance, so it is an efficient ingredient for adjusting optical constants. The preferred content of MgO in weight percent is 4.5%~7.5%. If MgO is more than 7.5%, the glass thus produced not only is easily to get devitrification but also chemical durability becomes worse.

CaO is to facilitate glass melting so as to lower the liquidus temperature of glass and to improve its devitrification resistance. The preferred content of CaO is 0%<CaO≤2.5%. If CaO is 0%, it is impossible to effectively lower the viscosity and liquidus temperature of glass. If CaO is more than 2.5%, devitrification resistance and chemical durability of glass will become worse and coefficient of expansion of glass will be remarkably increased, and it is disadvantageous for the application in subsequent processes.

ZnO can increase corrosion resistance and meltability of glass, which has the effects of improving chemical durability and reducing liquidus temperature of glass. The preferred content of ZnO in weight percent is 0%<ZnO≤2%. If ZnO is 0%, above effects become obscured. If ZnO is more than 2%, devitrification resistance of glass will be worsened.

$ZrO_2$ has the effects of increasing chemical durability, heat resistance, meltability, devitrification resistance and chemical durability of glass. The preferred content of $ZrO_2$ in weight percent is 0%<$ZrO_2$≤0.2%. If $ZrO_2$ is 0%, above effects become obscured. If $ZrO_2$ is more than 0.2%, devitrification resistance of glass will be deteriorated so as to be disadvantageous to the application of products. $TiO_2$ can decrease the melting temperature of glass raw materials, and the preferred content of $TiO_2$ in wt/% is 0%<$TiO_2$≤1%.

The cover glass thus formed by the constitution of the present invention has to be dipped in $KNO_3$ solution with high temperature in chemical strengthening method so that sodium ions ($Na^-$), which is smaller in volume, contained in the surface layer of the cover glass can be substituted by potassium ions ($K^+$), which is larger in volume. In this manner, a cover glass having high strength and resistance in both abrasion and scratch can be formed. A definite quantity of sodium ions therefore has to be existed in the cover glass; $Na_2O$ is thus added to the constitution of the present invention so as to provide sufficient quantity of sodium ions. Moreover, $Na_2O$ can lower both the melting temperature and the liquidus temperature of glass to improve the formability of glass. The preferred content of $Na_2O$ in wt. % is 14.5%~16.5%. If $Na_2O$ is more than 16.5%, devitrification resistance of glass will be worsened. $K_2O$ can lower both the melting temperature and the liquidus temperature of glass. The preferred content of $K_2O$ in wt. % is 1%~4%. If $K_2O$ is more than 4%, it is easily to get devitrification.

The function of $SnO_2$ is mainly to substitute $As_2O_3$ or $Sb_2O_3$, and to act as a refining agent during glass melting. The preferred content of $SnO_2$ in wt. % is 0%<$SnO_2$≤0.4%. If $SnO_2$ is 0%, the above effects become obscure. If $SnO_2$ is more than 0.4%, not only the devitrification resistance of glass becomes worsened to be disadvantageous for the application of products, but also $SnO_2$ is easily to be condensed at a place of low temperature on the upper part of a platinum system during temperature reduction process of glass and may drop off back to the glass liquid to cause defects that may result in worsened yield rate.

Although CaO and MgO can facilitate the meltability of glass and adjust the coefficient of expansion of glass, the total content of CaO and MgO is preferably 4.5%~10%. If the total content of CaO and MgO is less than 4.5%, the melting temperature of glass will become too high. On the contrary, if the total content of CaO and MgO is more than 10%, it is easily to get devitrification in glass and the coefficient of thermal expansion of glass will become too high. Further, the total content of $Na_2O$ and $K_2O$ is preferably 15.5%~20.5%. If the total content of $Na_2O$ and $K_2O$ is less than 15.5%, both the melting temperature and the liquidus temperature of glass will become too high. On the other hand, if the total content of $Na_2O$ and $K_2O$ is more than 20.5%, the devitrification resistance of glass will be worsened.

In the implementation of the present invention, firstly the compositions are well blended and the batch thus formed is poured into a glass melting tank. After the batch is melted into glass liquid, the temperature is reduced to the range required for forming and then glass sheet with predetermined thickness is formed by downdraw method.

Each of the abovementioned compositions according to the present invention is blended in different wt. % with the others and then a variety of glass samples are formed according to the above processes. Taking these samples as examples, the difference between the properties of coefficient of thermal expansion, strain point, density and liquidus temperature of glass can be apparently understood from the table.

Table 1 (example 1) is an embodiment of the present invention, the sample of which is made as follow: each of the compositions is normally used material and the wt. % thereof is according to corresponding value. After mixing uniformly, the mixture is melted in the melting pot operating at a temperature of 1650° C. and is uniformly stirred in a platinum heating system, and then the glass liquid in melting state is formed by downdraw method and is cooled to form glass sheet. Next, measurements are conducted on the glass sample and the properties of coefficient of thermal expansion, strain point, density and liquidus temperature of glass can be obtained respectively.

The measurements of each property value of each glass sample are conducted according to the methods below.
(1) coefficient of thermal expansion (unit: $10^{-7}$/° C.): A pushrod type thermal dilatometry is used to heat the glass and to measure the elongation of glass sample, from room temperature until a temperature at which the glass is no more elongate or even become softened to contract.
(2) Strain point (unit:° C.): Heat the glass and measure to obtain the graph of deformation rate of glass sample versus temperature, and a temperature corresponding to a specific viscosity ($10^{14.5}$ Poise) is acted as the strain point.

(3) Density (g/cm³): A block of glass with 2 gram weight and without bubbles contained therein is utilized. The density is measured by the state how the glass sample is drifting in density liquid.

(4) Liquidus temperature of glass (unit: ° C.): A glass chip smaller than 850 μm is placed in a vessel, then the vessel with the glass ship is put into a gradient furnace for a period of 24 hrs. Then, a microscope is used to observe the crystallization of the glass so as to determine the liquidus temperature of the glass.

TABLE 1

| | Example 1 |
|---|---|
| Weight % of $SiO_2$ | 64-69 |
| Weight % of $Al_2O_3$ | 7-11.5 |
| Weight % of $B_2O_3$ | 1.5-2.5 |
| Weight % of MgO | 4.5-7-5 |
| Weight % of CaO | 0% < CaO ≤ 2.5% |
| Weight % of ZnO | 0% < ZnO ≤ 2% |
| Weight % of $ZrO_2$ | 0% < $ZrO_2$ ≤ 0.2% |
| Weight % of $TiO_2$ | 0% < $TiO_2$ ≤ 1% |
| Weight % of $Na_2O$ | 14.5-16.5 |
| Weight % of $K_2O$ | 1-4 |
| Weight % of $As_2O_3$ | 0 |
| Weight % of $Sb_2O_3$ | 0 |
| Weight % of $SnO_2$ | 0% < $SnO_2$ ≤ 0.4% |
| coefficient of thermal expansion (unit: $10^{-7}$/° C.) (0° C.-300° C.) | 83.9 |
| Strain point (unit: ° C.) | 565 |
| Density (g/cm³) | 2.45 |

It is apparent from the data listed in Table 1, the cover glass made by the constitution according to the present invention has coefficient of thermal expansion lower than $-83.9 \times 10^{-7}$/° C., strain point higher than 565° C., density smaller than 2.45 g/cm³, that are quite similar to the properties of glass substrate of ordinary LCD. Therefore, the cover glass made by the constitution according to the present invention is adaptable to the glass substrate of ordinary liquid crystal display.

Summing up above, according to the present invention, network structure is formed in the glass by adding $SiO_2$; stiff surface can be created, and heat resistance, devitrification resistance can be increased, and rate of expansion of glass can be reduced by adding $Al_2O_3$; viscosity and coefficient of thermal expansion of glass can be reduced by adding MgO and CaO; corrosion resistance and meltability of glass can be increased by adding ZnO; chemical resistance of glass can be raised by adding $ZrO_2$; melting temperature of glass raw materials can be lowered by adding $TiO_2$; easiness of formability of glass can be achieved by adding $Na_2O$; glass viscosity can be increased so as to allow the glass to become hard and to have gloss by adding $K_2O$; and PbO, $As_2O_3$ or $Sb_2O_3$ can be substituted by $SnO_2$ which acts as a refining agent. In this manner, the structure can be strengthened by adding and changing the proportion of compositions. It is found in the implementation, a cover glass with devitrification resistance and without inclusion of environmentally unfriendly compositions of $As_2O_3$ or $Sb_2O_3$ can be provided undoubtedly. Then, the cover glass is dipped in $KNO_3$ solution with high temperature so that sodium ions ($Na^-$), which is smaller in volume, contained in a certain depth from the surface layer of the cover glass can be substituted by potassium ions ($K^+$), which is larger in volume. In this manner, squeezing effect is generated on the surface layer of the cover glass so as to form cover glass with high strength and resistance for both abrasion and scratch.

While the present invention has been described by preferred embodiments in conjunction with accompanying drawings, it should be understood that the embodiments and the drawings are merely for descriptive and illustrative purpose, not intended for restriction of the scope of the present invention. Equivalent variations and modifications conducted by person skilled in the art without departing from the spirit and scope of the present invention should be considered to be still within the scope of the present invention.

The invention claimed is:

1. A composition of cover glass, wherein the composition consists, indicated in terms of weight % on the oxide basis, of:
$SiO_2$, 64%~69%;
$Al_2O_3$, 7%~11.5%;
$B_2O_3$, 1.5%~2.5%;
MgO, 4.5%~7.5%;
0%<CaO≤2.5%;
0%<ZnO≤2%;
0%<ZrO≤20.2%;
0%<$TiO_2$≤1%;
$Na_2O$, 14.5%~16.5%;
$K_2O$, 1%~4%; and
0%<$SnO_2$≤0.4%.

* * * * *